(12) United States Patent
Skinner

(10) Patent No.: US 8,587,143 B2
(45) Date of Patent: Nov. 19, 2013

(54) ENERGY CONVERTER DEVICE WITH REACTIVE HYDRAULIC POWER TRANSFORMER

(75) Inventor: Niall Skinner, Loanhead (GB)

(73) Assignee: MacTaggart, Scott (Holdings) Limited, Loanhead, Midlothian (GB)

( * ) Notice: Subject to any disclaimer, the term of this patent is extended or adjusted under 35 U.S.C. 154(b) by 405 days.

(21) Appl. No.: 12/854,307

(22) Filed: Aug. 11, 2010

(65) Prior Publication Data

US 2011/0062714 A1 Mar. 17, 2011

(30) Foreign Application Priority Data

Aug. 11, 2009 (GB) ................................ 0914015.3

(51) Int. Cl.
*F03B 13/22* (2006.01)
(52) U.S. Cl.
USPC .............................................. 290/53; 60/413
(58) Field of Classification Search
USPC ................... 290/53, 54; 60/327, 413
See application file for complete search history.

(56) References Cited

U.S. PATENT DOCUMENTS

| | | | | |
|---|---|---|---|---|
| 4,974,994 | A * | 12/1990 | Kirstein et al. ................. | 405/79 |
| 5,852,933 | A * | 12/1998 | Schmidt ........................... | 60/413 |
| 6,370,873 | B1 * | 4/2002 | Schaich et al. .................. | 60/413 |
| 6,575,076 | B1 * | 6/2003 | Achten ........................... | 91/6.5 |
| 7,081,689 | B2 * | 7/2006 | Tilscher et al. ................. | 290/44 |
| 7,775,040 | B2 * | 8/2010 | Khalil ............................. | 60/419 |
| 7,863,767 | B2 * | 1/2011 | Chapple et al. ................. | 290/54 |
| 2003/0110766 | A1 * | 6/2003 | Berlinger et al. ............... | 60/419 |
| 2003/0196433 | A1 * | 10/2003 | Baer et al. ....................... | 60/419 |
| 2007/0261404 | A1 | 11/2007 | Stewart et al. | |
| 2009/0178399 | A1 * | 7/2009 | Bishop ............................. | 60/413 |
| 2012/0144815 | A1 * | 6/2012 | Stromotich ..................... | 60/327 |

FOREIGN PATENT DOCUMENTS

| | | |
|---|---|---|
| GB | 1541571 A | 3/1979 |
| GB | 2414771 A | 12/2005 |
| WO | 2009/003598 A1 | 1/2009 |
| WO | 2009/132762 A2 | 11/2009 |
| WO | 2011162817 A1 | 12/2011 |

OTHER PUBLICATIONS

European Search Report received for corresponding European patent application No. EP 10 25 1420, dated Feb. 6, 2012.
International Search report received for corresponding UK patent application No. GB0914015.3 dated Nov. 12, 2009.

* cited by examiner

*Primary Examiner* — Michael Zarroli
(74) *Attorney, Agent, or Firm* — Wong, Cabello, Lutsch, Rutherford & Brucculeri, L.L.P.

(57) ABSTRACT

An energy converter device includes a reactive hydraulic power transformer (16) for converting periodic and variable hydraulic energy into coherent hydraulic energy. The device may also form a sub-system in energy converter systems for converting kinetic energy, for example from a wave (12), into electricity. The system has a power takeoff (14) including an energy capture device (22) for capturing energy from the wave (12), or other power source, and the power takeoff transfers this captured energy to the transformer (16). An accumulator (18) may be provided for storing and selectively discharging the captured energy to a generator (20) to produce electricity. At least part of the captured energy may be fed back through the transformer (16) to facilitate control over the phase and/or position of the energy capture device (22) relative to the wave (12) or other energy source.

19 Claims, 5 Drawing Sheets

ENERGY CONVERTER DEVICE WITH REACTIVE HYDRAULIC POWER TRANSFORMER

CROSS REFERENCE TO RELATED APPLICATION

The present application claims priority to United Kingdom Application 0914015.3 filed on 11 Aug. 2009, the contents of which are incorporated herein by reference.

FIELD OF THE INVENTION

This invention relates to an energy converter device for converting periodic and variable hydraulic energy into useful, coherent hydraulic energy with constant pressure. A device according to embodiments of the present invention may also form a sub-system in systems for converting kinetic energy into electricity and, in particular, but not exclusively, to a wave energy converter (WEC) device capable of providing reactive control of at least one of the phase and amplitude of the device relative to a wave according to prevailing sea conditions.

BACKGROUND OF THE INVENTION

In recent years there has been increasing demand for reliable generation of electricity from renewable energy sources such as wind, solar, tidal or wave sources. Of particular interest is the desire to provide efficient and cost effective electricity generation on a commercial scale. Due to the relative abundance of wave energy, these systems offer the possibility of high levels of efficiency and reliability of supply.

One proposed form of energy converter developed for converting wave energy into electricity consists of a buoy connected to a piston and cylinder arrangement, this converter generally known as a heaving buoy generator. The piston and cylinder arrangement is secured between the buoy and the sea floor, an anchor or reaction plate so that the piston moves linearly within the cylinder in response to movement of the buoy with the waves. The reciprocal action of the piston is used to charge a hydraulic accumulator which is selectively discharged to drive a hydraulic generator. However, the cost of energy (COE) of this type of system remains relatively high. One reason for this is that the wave energy converter is often not in phase, or cannot remain in phase, with the wave resulting in a marked reduction in efficiency of energy capture and corresponding increases in COE.

Reactive control for energy converters, such as the heaving buoy generator described above, offers the potential to vastly increase the efficiency of energy capture and is discussed by Harvard Eidsmoen in "Simulation of a tight moored, amplitude limited heaving buoy wave energy converter with phase control" and "Simulation of a slack moored heaving buoy wave energy converter with phase control", and the applicant's "Power Take-off Devices—Requirement Setting and Benchmark Review of Existing Technologies, MTSR 3877", which are incorporated herein in their entirety by way of reference.

However, such technology has not been implemented on commercial scale devices due, it is believed, to the complexity, reliability and efficiency challenges presented by such technologies.

SUMMARY OF THE INVENTION

According to a first aspect of the present invention, there is provided an energy converter device comprising a reactive hydraulic power transformer configurable to convert a periodic and variable hydraulic energy input into a coherent hydraulic energy output, wherein at least part of the energy from the output of the transformer is selectively fed back through the transformer to permit at least one of the phase and position of an energy capture device associated with the transformer to be controlled.

According to a second aspect of the present invention, there is provided an energy converter system for converting kinetic energy from a wave into electricity, the system comprising:
an energy capture device;
a reactive hydraulic power transformer configurable to convert periodic and variable hydraulic energy captured by the energy capture device into a coherent hydraulic energy output, wherein at least part of the energy from the output of the transformer is selectively fed back through the transformer to permit at least one of the phase and position of the energy capture device associated with the transformer to be controlled; and
a generator for converting the output from the transformer into electricity.

The energy capture device is configured to capture energy from a power source, such as a wave, and by controlling the phase and/or position of the energy capture device relative to the power source or wave, energy capture may be controlled.

The energy capture device may form part of a power take-off and the power takeoff may, for example, be configurable to generate a bi-directional fluid flow using the energy captured from the power source, such as the wave, and the transformer may be configured to convert the bi-directional fluid flow from the power takeoff into a uni-directional fluid output flow.

Accordingly, embodiments of the present invention are capable of generating electricity from a wave both as it rises and as it falls. By converting the periodic and variable energy from the energy capture device into a coherent output, a transformer according to embodiments of the invention ensures that the generator is rotated in a single direction and facilitates efficient generation of electricity. More particularly, embodiments of the present invention permit at least part of the energy from the output from the transformer to be fed back through the transformer so that the phase and/or position of the energy capture device can be controlled relative to the energy source, such as the wave. Thus, it will be recognised that embodiments of the invention permit the position and/or phase of the energy capture device to be "tuned" to optimise or at least improve energy capture. Furthermore, by controlling the position and/or phase of the energy capture device, embodiments of the present invention also permit the energy capture device to be "de-tuned", for example to facilitate continued electricity generation in higher sea state conditions or in conditions which may otherwise be detrimental to the device.

This contrasts with existing technologies which employ simple passive operation or stepwise switching control.

In preferred embodiments, the system further comprises an energy storage device configurable to hold the energy stored by the system and configurable to selectively discharge the energy. For example, the energy storage device may comprise a hydraulic accumulator configurable to hold the fluid output from the transformer and selectively discharge the held fluid to the generator. The provision of an accumulator permits energy to be stored and then discharged to the generator when required, for example, at occasions of peak generation or at a range of displacement flows most suitable for the generator to operate, thereby facilitating efficient and reliable generation of electricity. The provision of an energy storage device also facilitates flow smoothing and the energy storage device may be configurable so that at least part of the energy held by the storage device or accumulator is fed back to the transformer. This permits at least one, and preferably both, of the phase and position of the energy capture device to be controlled, for example relative to the wave, to influence energy capture.

In preferred embodiments, the reactive hydraulic power transformer comprises first and second hydraulic devices operatively coupled together and, in particular embodiments, the first and second devices may be coupled together by a shaft, though any suitable coupling may be employed.

The first and second hydraulic devices may comprise hydraulic pump/motor units, that is, the hydraulic devices may be configurable to operate either as a pump or as a motor.

In a first mode of operation, the first pump/motor unit may be configured to operate as a motor and the second pump/motor unit may be configured to operate as a pump. In embodiments where the first and second units are coupled by a shaft, in the first mode of operation the first unit may be configured to operate as a motor to drive rotation of the shaft and the second unit may be configured to operate as a pump utilising rotation of the shaft. Rotation of the shaft may charge the energy storage device and the energy stored may then be selectively discharged to drive the generator and/or fed back to the transformer to provide for reactive control. Alternatively, rotation of the shaft may be used to drive the generator directly to produce electricity. This may be the case, for example, in embodiments not having an energy storage device.

In a second mode of operation, the second pump/motor unit may be configured to operate as a motor and the first pump/motor unit may be configured to operate as a pump. In embodiments where the first and second units are coupled by a shaft, in the second mode of operation the second unit may be configured to operate as a motor to drive rotation of the shaft and the first unit may be configured to operate as a pump utilising rotation of the shaft. This allows the phase and position of the energy capture device to be controlled, for example relative to the wave, to optimise or otherwise improve energy capture.

At least one of the first and second hydraulic devices may comprise a positive displacement pump/motor unit, for example an axial piston pump/motor unit, and in particular embodiments both the first and the second units comprise axial piston pump/motor units.

At least one of the hydraulic devices may comprise a variable displacement hydraulic device.

The energy capture device may be of any suitable form. For example, the energy capture device may comprise a buoyant device, such as a heaving buoy. In particular embodiments, the energy capture device may provide a housing for at least one or all of the other parts of the system.

Where the system comprises a wave energy converter, at least part of the system may be located on the surface of a body of water. For example, the energy capture device may be located on surface and may be arranged to interact with waves. Alternatively, at least part of the system may be submerged.

In particular embodiments, the power takeoff may further comprise a piston and cylinder arrangement and this may be adapted to be coupled to the energy capture device. In use, the piston and cylinder arrangement may be configurable to convert movement of the capture device into the bi-directional fluid flow. The piston and cylinder arrangement may be secured between the capture device and the sea floor, riverbed or other suitable reaction plate or anchor. For example, a piston may be coupled to the capture device and a cylinder may be coupled to the anchor, whereby movement of the energy capture device with the wave results in reciprocal movement of the piston within the cylinder.

The device and/or system may further comprise a displacement controller for controlling the fluid displacement through the transformer. For example, at least one, and preferably both, of the hydraulic devices may be individually controlled by the displacement controller. This arrangement facilitates infinitely variable reactive control between minimum and maximum displacement from the transformer.

The generator may comprise a motor and, in particular embodiments, the generator comprises a uni-directional hydraulic motor. In use, the generator motor may be configured to convert the output from the transformer and/or energy storage device into rotation of the generator motor output shaft, thereby permitting the generator to be operated in a single direction and at a desired speed.

According to a further aspect of the present invention, there is provided a method of controlling energy capture of an energy converter device, the method comprising:

providing an energy converter device comprising a reactive hydraulic power transformer configurable to convert a periodic and variable hydraulic energy input into a coherent hydraulic energy output; and selectively directing at least part of the energy from the output of the transformer back through the transformer to permit at least one of the phase and position of an energy capture device associated with the transformer to be controlled.

It should be understood that the features defined above in accordance with any aspect of the present invention may be utilised, either alone or in combination, with any other defined feature, in any other aspect of the invention.

BRIEF DESCRIPTION OF THE DRAWINGS

These and other aspects of the present invention will now be described, by way of example only, with reference to the accompanying drawings, in which.

DETAILED DESCRIPTION OF THE DRAWINGS

Figure 1:
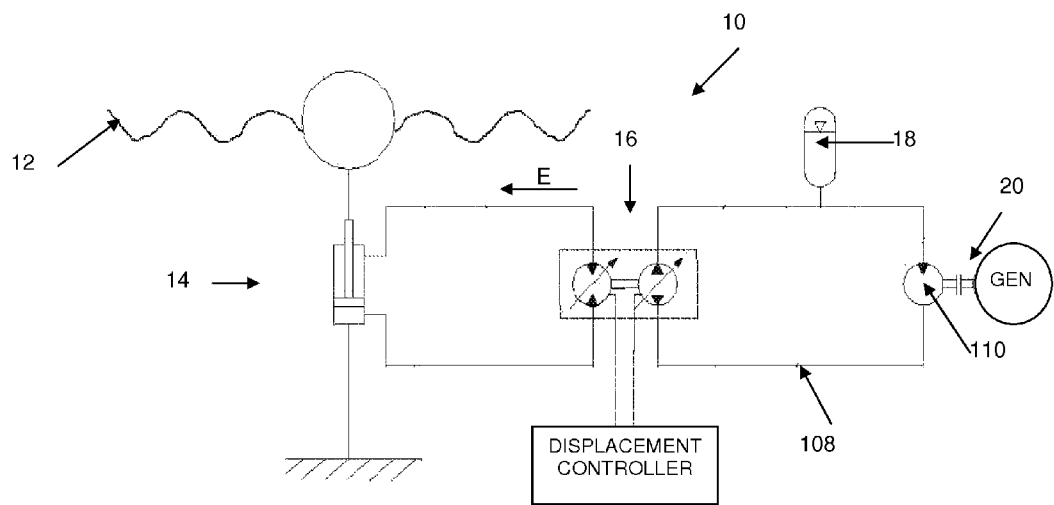
FIG. 1 is a schematic view of a wave energy converter device according to an embodiment of the present invention.

A schematic view of an energy converter system 10 according to an embodiment of the present invention is shown in FIG. 1. In use, the system 10 converts kinetic energy from a wave 12 into electricity.

As shown in FIG. 1, the system 10 comprises a power takeoff 14 including an energy capture device for capturing energy from the wave 12 and transferring this to a hydraulic power transformer 16, an accumulator 18 for storing energy in the system 10 and a generator 20 for producing electricity. The system 10 is configurable to permit at least some of the energy E output from the transformer 16 to be fed back through the transformer 16 to facilitate control over at least one of the phase and position of the energy capture device relative to the wave 12.

Figure 2:
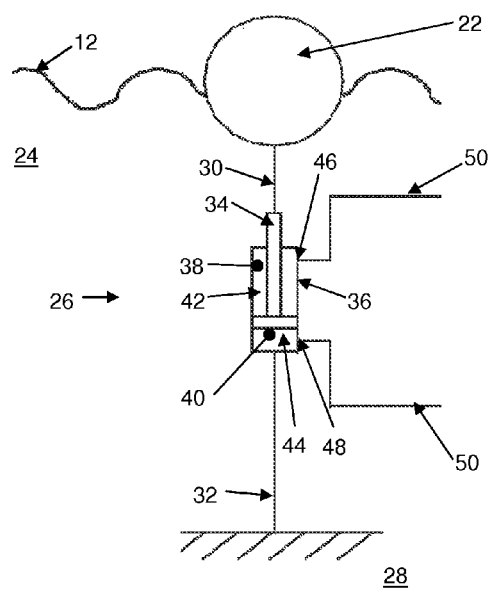
FIG. 2 is an enlarged schematic view of a power takeoff device of the system shown in FIG. 1.

An enlarged view of the power takeoff 14 is shown in FIG. 2. As shown in the figure, the energy capture device of the power takeoff 14 comprises a buoy 22 located on a body of moving water 24, the buoy 22 positioned so that it can interact with the water 24, and in particular with the waves 12 formed on or in the water. The power takeoff 14 also comprises a piston and cylinder arrangement 26 secured between the buoy 22 and the seabed 28 by tethers 30, 32. In the embodiment shown, a piston 34 of the power takeoff 14 is coupled to the buoy 22 by the tether 30 and a cylinder 36 of the power takeoff 14 is secured to the seabed 28 by the tether 32 so that movement of the buoy 22 with the wave 12 causes reciprocal movement of the piston 34 within the cylinder 36.

The piston 34 divides the cylinder 36 into two fluid chambers 38, 40 and each chamber 38, 40 contains hydraulic fluid 42, 44. In the embodiment shown, the cylinder 36 comprises a double acting cylinder having two ports 46, 48: one port 46 associated with the chamber 38; and a second port 48 associated with the chamber 40.

In use, as the buoy 22 moves upwards on the wave 12, the piston 34 is pulled upwards to reduce the volume of the chamber 38 and force the hydraulic fluid 42 from the chamber 38 through the port 46. As the volume of the chamber 38 reduces, the chamber 40 increases in volume and hydraulic fluid 44 is drawn into the chamber 40. Conversely, as the buoy 22 moves downwards on the wave 12, the piston 34 is pushed downwards to reduce the volume of the chamber 40 and force the hydraulic fluid 44 from the chamber 40. As the volume of the chamber 40 reduces, the chamber 38 increases in volume and hydraulic fluid 42 is drawn into the chamber 38. Thus, reciprocal movement of the piston 34 with the buoy 22 drives the hydraulic fluid 42, 44 from the chambers 38, 40 on both the up and down stroke of the piston 34.

Figure 3:
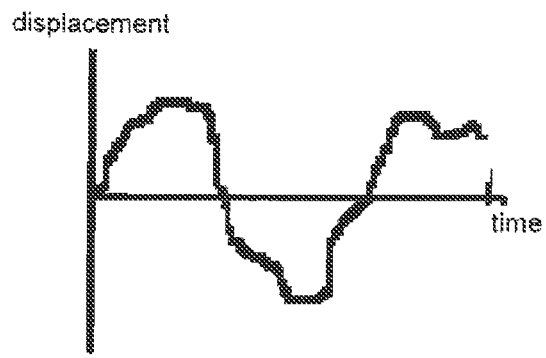
FIG. 3 is a displacement-time graph for fluid exiting the power takeoff of the system shown in FIGS. 1 and 2.

FIG. 3 shows a fluid displacement-time graph for the system 10 at the output of the power takeoff 14. As can be seen from the graph, the displacement is of variable amplitude (shown by the generally sinusoidal shape of the graph) and is bi-directional (negative displacement represents a change in direction).

Referring again to the schematic views of the system shown in FIGS. 1 and 2, hydraulic lines 50 are coupled to the outlet ports 46, 48 and the lines 50 transport the hydraulic fluid 42, 44 between the power takeoff 14 and the hydraulic power transformer 16. In use, the hydraulic power transformer 16 converts the bi-directional fluid flow from the power takeoff 14 into a uni-directional output fluid flow.

A transformer 16 according to an embodiment of the present invention will now be described with reference to FIGS. 4 to 9.

Figure 4:
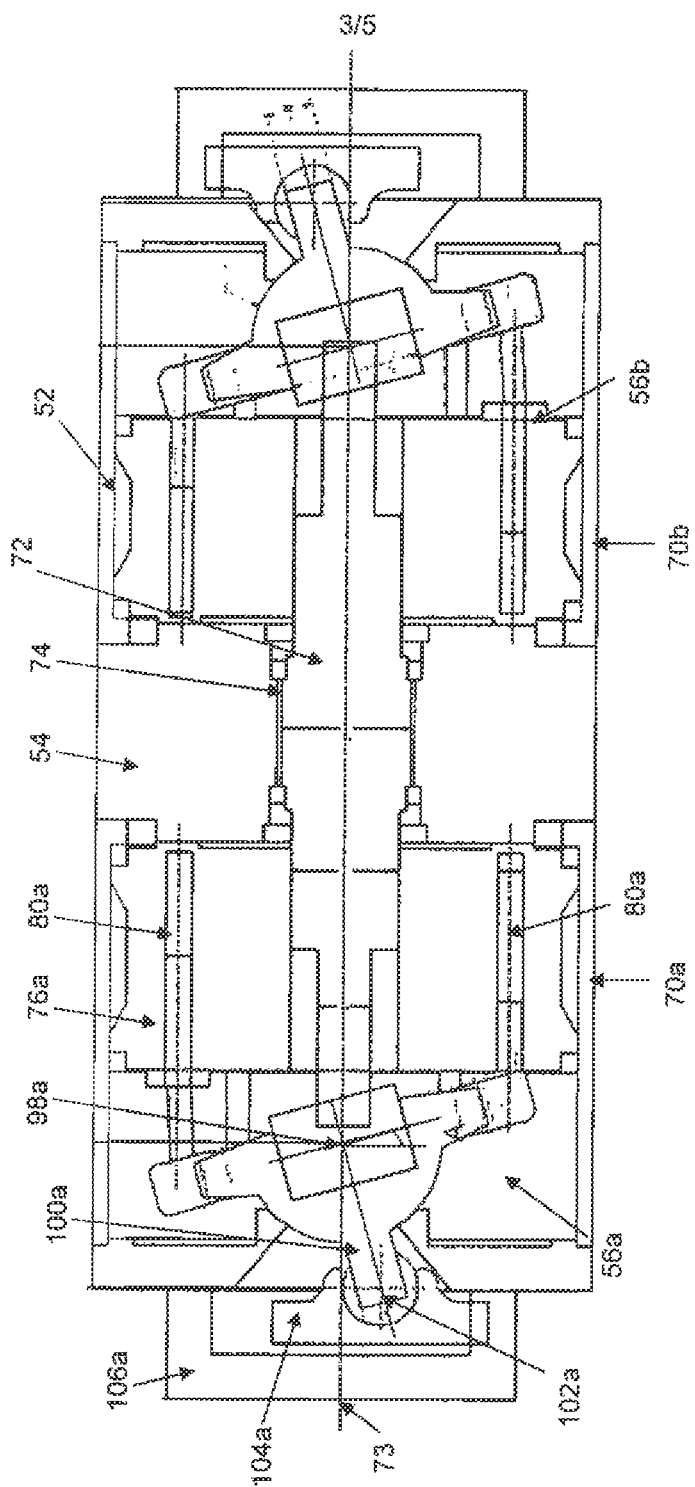
FIG. 4 is a cross-sectional view of a hydraulic power transformer of the system shown in FIGS. 1 to 3.
Figure 5:
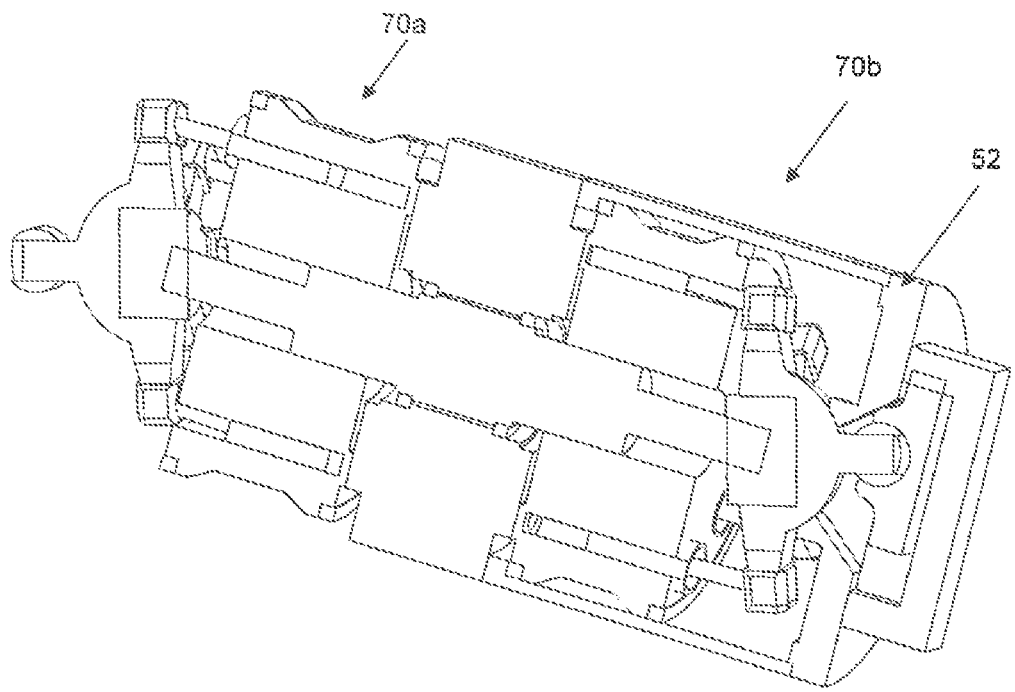
FIG. 5 is a perspective cross-sectional view of the hydraulic power transformer shown in FIG. 4.

As shown in FIGS. 4 and 5, the transformer 16 comprises a generally cylindrical housing 52 having a partition or core 54 dividing the housing 52 into two chambers 56a, 56b.

Figure 6:
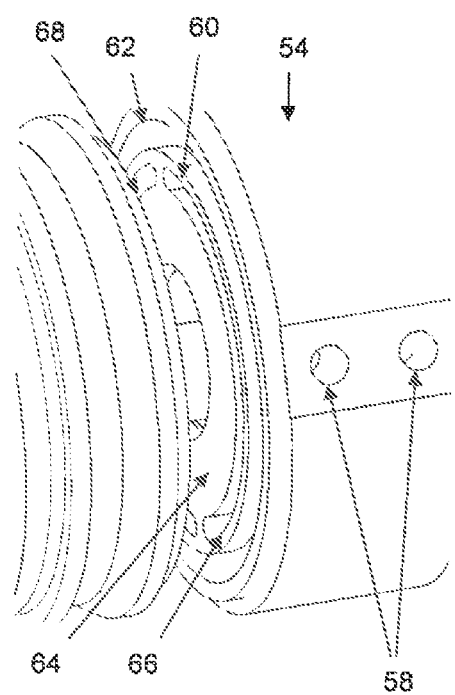
FIG. 6 is an enlarged perspective view of a distal end section of part of the transformer shown in FIGS. 4 and 5.
Figure 7:
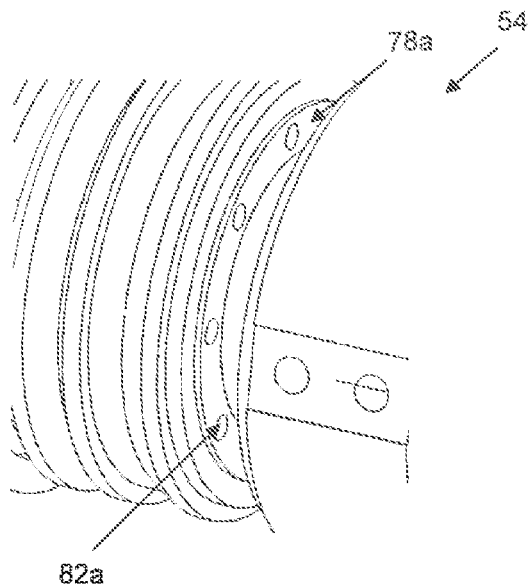
FIG. 7 is another enlarged perspective view of a distal end section of part of the transformer shown in FIG. 6.

Enlarged perspective views of a distal end section of the core 54 are shown in FIGS. 6 and 7, respectively, and as can be seen from FIG. 6, two ports 58 extend radially into the core 54. When assembled, the hydraulic lines 50 are coupled to the ports 58 to permit transfer of the hydraulic fluid 42, 44 between the power takeoff 14 and the transformer 16. A boss portion 60 extends axially from a distal end face 62 of the core 54 and defines a raised surface 64. Two arc-shaped ports 66, 68 extend into the core 54 and communicate with the radial ports 58 to permit transfer of the hydraulic fluid 42, 44 through the core 54.

Referring again to FIGS. 4 and 5, two variable displacement hydraulic pump/motor units 70a, 70b are located in the housing 52, one pump/motor unit 70a located in the chamber 56a and a second pump/motor unit 70b located in the chamber 56b. In the embodiment shown, the pump/motor units 70a, 70b are coupled together by a shaft 72 extending through the core 54 and the shaft 72 is mounted on the core 54 on bearings 74 so that the shaft 72 can rotate about its longitudinal axis (shaft axis 73).

The first pump/motor unit 70a is of an axial piston motor/pump type and comprises a cylinder block 76a positioned in the chamber 56a adjacent to the core 54 so that part of a face 78a (shown most clearly in FIG. 7) of the cylinder block 76a forms a face seal against the raised surface 64 of the core boss portion 60 (shown in FIG. 6).

A number of cylinders 80a are provided in the cylinder block 76a (two cylinders 80a are shown in cross-section in FIG. 4) and each cylinder 80a comprises a port 82a (seven of the ports 82a are shown in FIG. 7) to permit fluid communication between the core 54 and each of the cylinders 80a. As shown, the arc-shaped ports 66, 68 act as fluid intake and fluid discharge ports for the cylinders 80a.

Figure 8:
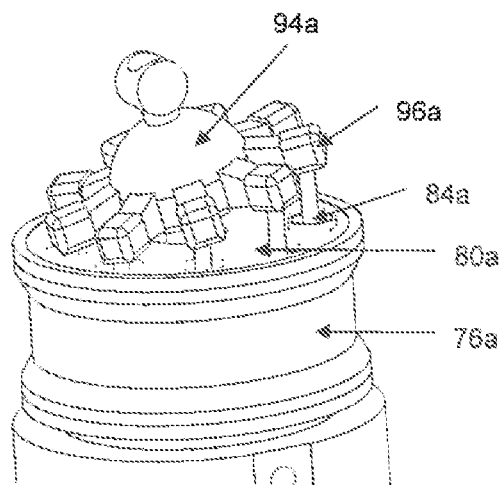
FIG. 8 is a perspective view of a cylinder block of the system shown in FIGS. 1 to 7.
Figure 9:
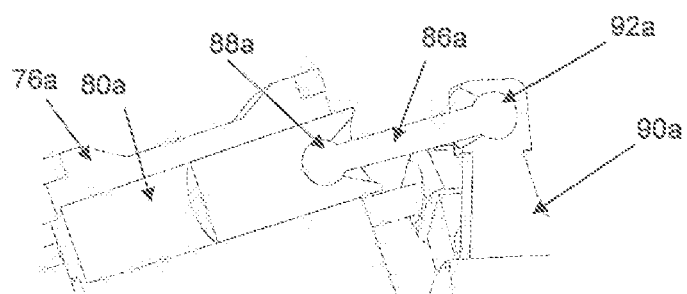
FIG. 9 is an enlarged cross-sectional view of part of the cylinder block shown in FIG. 8.

FIG. 8 shows a perspective view of the cylinder block 76a and FIG. 9 is an enlarged cross-sectional view of part of the cylinder block 76a shown in FIG. 8. In the embodiment shown, nine cylinders 80a are located in a circular array in the cylinder block 76a and a piston 84a is mounted within each of the cylinders 80a.

A distal end of the piston 84a is coupled to a linkage member 86a by a ball joint 88a or other suitable joint. A distal end of the linkage member 86a is in turn coupled to a swash plate 90a by a ball joint 92a or other suitable joint. In the embodiment shown, the swash plate 90a is formed as a generally hemi-spherical hub 94a having a number of radially extending spokes 96a, the number of spokes 96a corresponding to the number of pistons 84a. The swash plate 90a is coupled to the shaft 72 by a constant velocity joint (cv joint 98a) or other similar connector which forces the swash plate 90a to rotate and swivel with the shaft 72. A pin 100a extends from the hub 94a of the swash plate 90a, the pin 100a also having a cylindrical coupling 102a for engaging a slider 104a or linear actuator which is mounted within a housing 106a formed coupled to the housing 52.

Referring again to FIG. 4, the swash plate 90a is arranged at an angle "A" with respect to the shaft axis 73, the angle A defining the maximum extension of each piston 84a. For example, FIG. 4 shows one piston 84a in an extended position and another piston 84a in a retracted position. In use, the slider 104a acts to control the angle A of the swash plate 90a relative to the shaft axis 73 and by varying the angle A the output fluid displacement from the pump/motor unit 70a can be varied as required. Thus, the slider 104a and associated control arrangement (not shown) forms a displacement controller for the system (the controller is shown schematically in FIG. 1).

In use, hydraulic fluid 42, 44 is directed from the power takeoff 14 to the core 54 via the hydraulic lines 50. The hydraulic fluid 42, 44 is then directed through the core 54 to the intake port and then on into a number of the cylinders 80a. Due to the arc shape of the intake 66 and discharge 68, at any one time some of the cylinders 80a are exposed to the intake 66 and some of the cylinders 80a are exposed to the discharge 68. Where a cylinder 80a is exposed to the intake 66, the hydraulic fluid is free to pass into the cylinder 80a to extend the piston 84a. As a piston 84a moves from the extended position to a retracted position, the cylinder 84a is exposed to the discharge 68 so that the hydraulic fluid in the cylinder 80a is driven out of the cylinder 80a.

In use, the shaft 72 is rotated about the shaft axis 73 and the cv joint 98a will force the swash plate 90a to rotate.

In the embodiment shown, the transformer 16 is substantially symmetrical about the core 54 and like components between the first and second pump/motor units 70a, 70b are represented by like numerals followed by the letter "a" and "b", respectively.

The pump/motor units 70a, 70b are configurable to operate either as a pump or a motor as required.

Thus, in a first mode of operation, the first pump/motor unit 70a operates as a motor and the second pump/motor unit 70b operates as a pump, whereby rotational motion of the shaft 72 about the shaft axis 73 is translated into reciprocal movement of the pistons 84b to provide fluid displacement output from the transformer 16 to charge the accumulator 18. Regardless of the direction of movement of the buoy 22, the shaft 72 will be rotated in the same direction such that the effect of the transformer 16 is to convert a bi-directional fluid input from the power takeoff 14 into a uni-directional fluid output.

Figure 10:
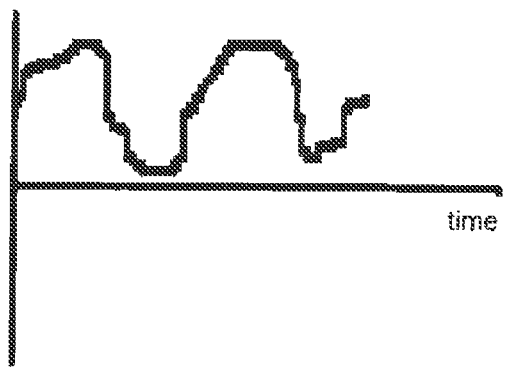
FIG. 10 is a displacement-time graph for fluid exiting the transformer.

FIG. 10 (shown on page 2 of the drawings for comparison with FIG. 3) shows a displacement-time graph for fluid exiting the transformer 16. As can be seen from the graph, on exiting the transformer 16 the fluid displacement is still variable in amplitude but is now uni-directional (the displacement is always positive).

Referring again to FIG. 1, the uni-directional fluid flow output from the transformer 16 is directed through hydraulic lines 108 to the accumulator 18 which acts to store the energy from the fluid output from the transformer 16. The accumulator 18 is selectively discharged to the generator 20 having a motor 110 (a uni-directional hydraulic motor is shown schematically in FIG. 1.

Figure 11:
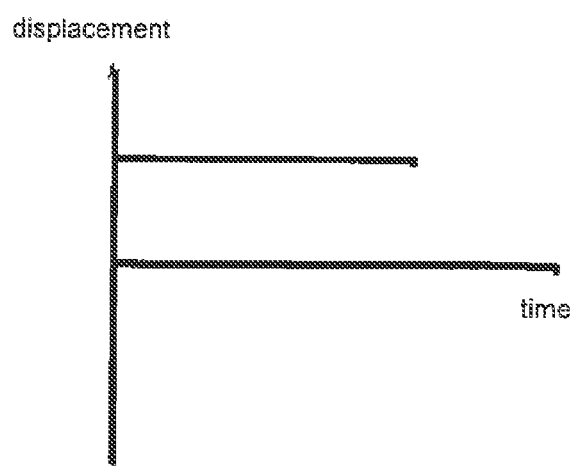
FIG. 11 is a displacement-time graph for fluid exiting an accumulator of the system shown in FIGS. 1 to 10.

FIG. 11 (shown on page 2 of the drawings for comparison with FIGS. 3 and 10) shows a displacement-time graph showing fluid displacement output from the accumulator 18. As can be seen from the graph, the flow is uni-directional and is of constant amplitude. By using an accumulator 18, output to the generator 20 can be precisely controlled to facilitate accurate speed control of the generator 20.

As both pump/motor units 70a, 70b can be operated either as a pump or a motor, embodiments of the present invention also facilitate a second mode of operation, whereby the second pump/motor unit 70b operates as a motor and the first pump/motor unit 70a operates as a pump. The transformer 16 can thus be used to pump fluid stored at pressure in the accumulator 18 back into the power takeoff 14, permitting control of the piston 34 of the power takeoff 14 and the buoy 22. By controlling the position and/or the phase of the buoy 22 relative to the wave 12, the buoy 22 can be made to remain in phase with the wave 12 to optimise, or at least improve, the energy captured from the wave 12. Alternatively, the position of the buoy 22 can be controlled so as to reduce the energy capture from the wave 12, this facilitating operation of the system 10 in high sea state conditions which may otherwise result in damage to the system 10.

It should be understood that the embodiment described herein is merely exemplary and that various modifications may be made thereto without departing from the scope of the invention.

For example, the invention may be used to convert any energy source in electricity, including for example wind, tidal or the like.

The hydraulic fluid of the system may comprise any suitable fluid, including for example seawater.

It will be recognised that the components of the system are shown schematically and, in particular embodiments, the components of the system may be located within the buoyant device.

The invention claimed is:

1. An energy converter device comprising:
a reactive hydraulic power transformer configurable to convert a periodic and variable hydraulic energy input into a coherent hydraulic energy output, wherein at least part of the hydraulic energy output from the transformer is selectively fed back through the transformer to control at least one of the phase and position of an energy capture device associated with the transformer, wherein the reactive hydraulic power transformer comprises first and second variable displacement hydraulic devices operatively coupled together.

2. The device of claim 1, wherein the first and second hydraulic devices comprise hydraulic pump/motor units.

3. The device of claim 2, wherein, in a first mode of operation, the first pump/motor unit is configured to operate as a motor and the second pump/motor unit is configured to operate as a pump.

4. The device of claim 2, wherein, in a second mode of operation, the second pump/motor unit is configured to operate as a motor and the first pump/motor unit is configured to operate as a pump.

5. The device of claim 1, wherein at least one of the first and second hydraulic devices comprises a positive displacement device.

6. The device of claim 1, wherein at least one of the first and second hydraulic devices comprises an axial piston pump/motor unit.

7. The device of claim 1, wherein the periodic and variable hydraulic energy input to the reactive hydraulic power transformer is from a first hydraulic circuit and the coherant hydraulic energy output from the reactive hydraulic power transformer is to a second hydraulic circuit.

8. An energy converter system for converting kinetic energy from a wave into electricity, the system comprising:
an energy capture device;
a reactive hydraulic power transformer configurable to convert periodic and variable hydraulic energy captured by the energy capture device into a coherent hydraulic energy output, wherein at least part of the hydraulic energy output from the transformer is selectively fed back through the transformer to permit at least one of the phase and position of the energy capture device associated with the transformer to be controlled, wherein the reactive hydraulic power transformer comprises first and second variable displacement hydraulic devices operatively coupled together; and
a generator for converting the output from the transformer into electricity.

9. The system of claim 8, wherein the energy capture device forms part of a power takeoff configurable to generate a bi-directional fluid flow using the energy captured from a power source.

10. The system of claim 9, wherein the transformer is configured to convert the bi-directional fluid flow from the power takeoff into a uni-directional fluid output flow.

11. The system of claim 8, wherein the first and second hydraulic devices comprise hydraulic pump/motor units.

12. The system of claim 11, wherein, in a first mode of operation, the first pump/motor unit is configured to operate as a motor and the second pump/motor unit is configured to operate as a pump.

13. The system of claim 11, wherein, in a second mode of operation, the second pump/motor unit is configured to operate as a motor and the first pump/motor unit is configured to operate as a pump.

14. The system of claim 8, wherein at least one of the first and second hydraulic devices comprises a positive displacement device.

15. The system of claim 8, wherein at least one of the first and second hydraulic devices comprises an axial piston pump/motor unit.

16. The system of claim 8, wherein the system comprises a wave energy converter.

17. The system of claim 8, wherein the periodic and variable hydraulic energy input to the reactive hydraulic power transformer is from a first hydraulic circuit and the coherant hydraulic energy output from the reactive hydraulic power transformer is to a second hydraulic circuit.

18. A method of controlling energy capture of an energy converter device, the method comprising:
providing an energy converter device comprising a reactive hydraulic power transformer configurable to convert a periodic and variable hydraulic energy input into a coherent hydraulic energy output, wherein the reactive hydraulic power transformer comprises first and second variable displacement hydraulic devices operatively coupled together; and
selectively directing at least part of the hydraulic energy output from the transformer back through the transformer to permit at least one of the phase and position of an energy capture device associated with the transformer to be controlled.

19. The method of claim 18, wherein the periodic and variable hydraulic energy input to the reactive hydraulic power transformer is from a first hydraulic circuit and the coherant hydraulic energy output from the reactive hydraulic power transformer is to a second hydraulic circuit.

* * * * *